2,768,876

PROCESS FOR THE PRODUCTION OF HCN FROM VOLATILE HYDROCARBONS AND AMMONIA

Ernst Wagner, Konstanz, Germany, assignor to Deutsche Gold- und Silber-Scheideanstalt vormals Roessler, Frankfurt (Main), Germany No Drawing. Application May 11, 1956, Serial No. 584,185

Claims priority, application Germany July 26, 1950

6 Claims. (Cl. 23—151)

The present invention relates to an improved process for the production of hydrocyanic acid from mixtures of volatile hydrocarbons and ammonia substantially devoid of oxygen in the presence of a platinum metal catalyst.

A number of processes have previously been proposed for the production of hydrocyanic acid by a catalytic reaction between ammonia and hydrocarbons, for example, methane, employing platinum metal catalysts. These processes generally involved reacting suitable gas mixtures in a converter lined with or consisting of refractory material, such as pure silica or an alumina silicate with a high content of silica, such as sillimanite. These processes, however, did not lead to satisfactory results, as the practical yields of hydrocyanic acid produced were low because of a rapid loss of activity of the platinum catalysts employed.

According to the invention, it was unexpectedly found that good yields of hydrocyanic acid can be obtained, which yields are maintained, by catalytically reacting ammonia and hydrocarbons, preferably methane, in the absence of oxygen employing platinum metal catalysts if the walls of the reaction chamber are constructed of a ceramic material composed of alumina containing 0.7 to 8%, preferably 1 to 4%, of silica. The yields of hydrocyanic acid obtained with reaction chambers constructed of such ceramic material is considerably higher than those obtainable when pure silica or alumina with a high content of silica was employed for the construction of the reaction chamber and, furthermore, is also higher than when essentially pure alumina is employed for the construction of the reaction chamber.

In carrying out the process according to the invention, it was found preferable to construct the reaction chamber so as to provide only a limited free space or cross-section in the reaction zone transverse to the flow of the reaction gases. Preferably, the reaction chambers are constructed to provide a narrow elongated reaction space of substantially uniform cross-section transverse to the flow of the reactant gas mixture, the walls of the reaction chamber along the elongated reaction space being spaced between 2 mm. and 15 mm., preferably about 4 mm. and 5 mm., apart. The elongated reaction space of narrow width can, for example, be obtained by providing an elongated reaction chamber constructed of an alumina-silica ceramic of the composition according to the invention and providing a concentrically disposed displacement body of such a material within such reaction chamber so as to leave only a relatively narrow annular space between the inner walls of the reaction chamber and the displacement body so as to increase the surface area of the reaction chamber while simultaneously decreasing the free space of the cross-section of the reaction chamber transverse to the flow of the reactant gases. It is essential that the outer surfaces of the displacement body run substantially parallel to the inner wall surface of the reaction chamber.

The platinum metal catalyst employed for the process according to the invention can be in the form of a foil or sheet as a lining on the walls of the reaction chamber, or it can be deposited as an adhesive layer on the ceramic walls of such chamber, for example, by applying a concentrated solution of chloroplatinic acid to such walls, drying and then reducing the chloroplatinic acid with hydrogen to deposit platinum metal on the walls.

The term "platinum metal catalyst" is employed herein not only to designate a catalyst of pure platinum but also catalysts of other platinum metals and platinum alloys, such as, for example, platinum rhenium and platinum ruthenium alloys.

While methane is the preferred hydrocarbon employed for the process according to the invention, other saturated hydrocarbons, such as ethane, propane and other saturated hydrocarbons with a larger number of carbon atoms, can be employed. Furthermore, unsaturated hydrocarbons, such as ethylene, as well as mixtures of hydrocarbons with each other or hydrogen, can be employed. Natural gas or methanized coke gas, for example, can be employed.

The temperatures employed for the process according to the invention are those normally employed in the production of hydrocyanic acid from gaseous mixtures of hydrocarbons and ammonia with the aid of platinum catalysts, for example, they can be between 900° C. and 1300° C., preferably between 1050° C. and 1250° C. The reaction gas mixtures can be preheated as admixtures prior to being introduced into the reaction zone, but it has been found advantageous to introduce the hydrocarbon and ammonia separately in the reaction chamber, the hydrocarbon being preheated to reaction temperature, the ammonia being maintained below its decomposition temperature, for example, below 700° C. and preferably below 500° C.

The following examples will serve to illustrate the nature of the present invention:

Example 1

A gaseous mixture at atmospheric pressure containing 3.5 moles methane and 3.5 moles ammonia was passed per hour at a temperature of 1200° C. through a ceramic tube 1200 mm. long with an internal diameter of 14 mm. provided with a concentrically disposed cylindrical ceramic displacement body 7 mm. in diameter to provide an annular reaction space 4 mm. wide. The ceramic material of the tube and cylinder was 97% $Al_2O_3$ and 3% $SiO_2$. The inner surface of the tube and the exterior of the cylinder were coated with platinum by impregnating the ceramic with a concentrated solution of chloroplatinic acid, drying and subsequent reduction with hydrogen. 91.3% of the ammonia employed was converted to hydrocyanic acid.

Example 2

Using the same conditions as in Example 1, but employing a ceramic composed of 98.2% $Al_2O_3$ and 1.8% of $SiO_2$ for the reaction tube and displacement cylinder, the yield of hydrocyanic acid was 89.7% based upon the ammonia employed.

Example 3

Similarly using the same conditions as in Example 1, but employing a ceramic composed of 96.4% of $Al_2O_3$ and 3.6% of $SiO_2$ for the reaction tube and displacement cylinder, the yield of hydrocyanic acid was 90.9% based upon the ammonia employed.

When essentially pure alumina (containing only 0.05 to 0.2% of $SiO_2$) was employed as the ceramic for the tube and displacement cylinder, all other conditions being the same, 79.8% of the ammonia employed was converted to hydrocyanic acid.

On the other hand, when a sillimanite ($Al_2O_3$ 60% $SiO_2$ 40%) tube of a 14 mm. internal diameter was employed as the tube and sillimanite was used for the displacement cylinder, all other conditions being the same, only 33% of the ammonia employed was converted to hydrocyanic acid.

*Example 4*

A gaseous mixture at atmospheric pressure consisting of 3 moles of methane and 3 moles of ammonia was passed per hour at a temperature of 1200° C. through ceramic tube 1000 mm. long with an internal diameter of 15 mm. provided with a concentrically disposed cylindrical displacement body 7 mm. in diameter. The ceramic of the tube and displacement body was the same as in Example 1, but in this instance the platinum metal catalyst coating was a mixture of 88% platinum and 12% ruthenium deposited in a manner analogous to the platinum coating employed in Example 1. The yield of hydrocyanic acid obtained was 84% based on the ammonia employed.

On the other hand, when sillimanite was used as the ceramic for the tube and displacement cylinder, all other conditions being the same, the yield of hydrocyanic acid was only 32%.

Furthermore, when an essentially pure alumina (containing only 0.05–0.2% of $SiO_2$) tube of a 14 mm. internal diameter was used as the tube and essentially pure alumina was used for the displacement cylinder, all other conditions being the same, the hydrocyanic acid yield was 71% based upon the ammonia employed.

Also, when sillimanite was used as the ceramic for the tube and displacement cylinder and the deposited platinum ruthenium coatings were replaced by a platinum ruthenium foil (88%/12%), all other conditions being the same, the yield of hydrocyanic acid was 59% after about 1 hour's operation, but after three hours' operation, the platinum ruthenium foil was destroyed to such an extent that the reaction space became clogged and had to be put out of operation.

This application is a continuation-in-part of application Serial No. 237,289 filed July 17, 1951 and now abandoned.

I claim:

1. In a process for the production of hydrocyanic acid from mixtures of volatile hydrocarbons and ammonia in the gaseous phase in the presence of a platinum metal catalyst, the step which comprises reacting such a gas mixture in the presence of a platinum metal catalyst in a heated reaction chamber the walls of which are of a ceramic material composed of 0.7 to 8% of $SiO_2$ and the remainder $Al_2O_3$.

2. The process of claim 1 in which said ceramic material is composed of 1 to 4% of $SiO_2$ and the remainder $Al_2O_3$.

3. The process of claim 1 in which the platinum metal catalyst is deposited as a coating on the walls of said reaction chamber.

4. In a process for the production of hydrocyanic acid from mixtures of volatile hydrocarbons and ammonia in the gaseous phase in the presence of a platinum metal catalyst, the step which comprises passing said gas mixture through a heated reaction chamber in the presence of a platinum metal catalyst, the walls of the reaction chamber being of a ceramic material composed of 0.7 to 8% of $SiO_2$ and the remainder $Al_2O_3$, the walls of said reaction chamber providing an elongated annular reaction space of substantially uniform cross-section transverse to the flow of the gas mixture.

5. The process of claim 4 in which the walls of the reaction chamber defining said annular space are 2 mm. to 15 mm. apart.

6. The process of claim 4 in which the walls of the reaction chamber defining said annular space are 4 mm. to 5 mm. apart.

No references cited.